United States Patent [19]

Wiegel

[11] Patent Number: 4,748,671
[45] Date of Patent: May 31, 1988

[54] MICROPHONE BOOM HINGE

[75] Inventor: Christopher D. Wiegel, Minneapolis, Minn.

[73] Assignee: Telex Communications, Inc., Minneapolis, Minn.

[21] Appl. No.: 934,122

[22] Filed: Nov. 21, 1986

[51] Int. Cl.⁴ .................... H04R 1/02; E05C 17/64; E05D 7/086; E05D 7/10
[52] U.S. Cl. .................................. 381/169; 16/257; 16/337; 16/342; 381/187
[58] Field of Search ............... 379/430, 449; 381/25, 381/74, 183, 187, 168, 169; 16/257, 258, 262, 337, 342, 381

[56] References Cited

U.S. PATENT DOCUMENTS 3,324,254  6/1967  Shaw et al. .................... 381/169

FOREIGN PATENT DOCUMENTS 323908   5/1970  Sweden .................... 16/337
875208   8/1961  United Kingdom ........ 16/262
1144675  3/1969  United Kingdom ........ 16/257

OTHER PUBLICATIONS

*Telephony*, "Headsets for Use with Telephone Systems", Ad., Aug. 30, 1982, p. 95.

Primary Examiner—Jin F. Ng
Assistant Examiner—Danita R. Byrd
Attorney, Agent, or Firm—Warren A. Sturm

[57] ABSTRACT

A microphone boom hinge is comprised of a pair of identical members disposed in locking interfitting relationship, each member having an end to be stationarily disposed on an end of a microphone boom and the other end having a pivot pin and an aperture on spaced apart longitudinally extending ears and configured to rotate about a transverse axis to provide for articulatory motion of an assembled boom.

11 Claims, 2 Drawing Sheets

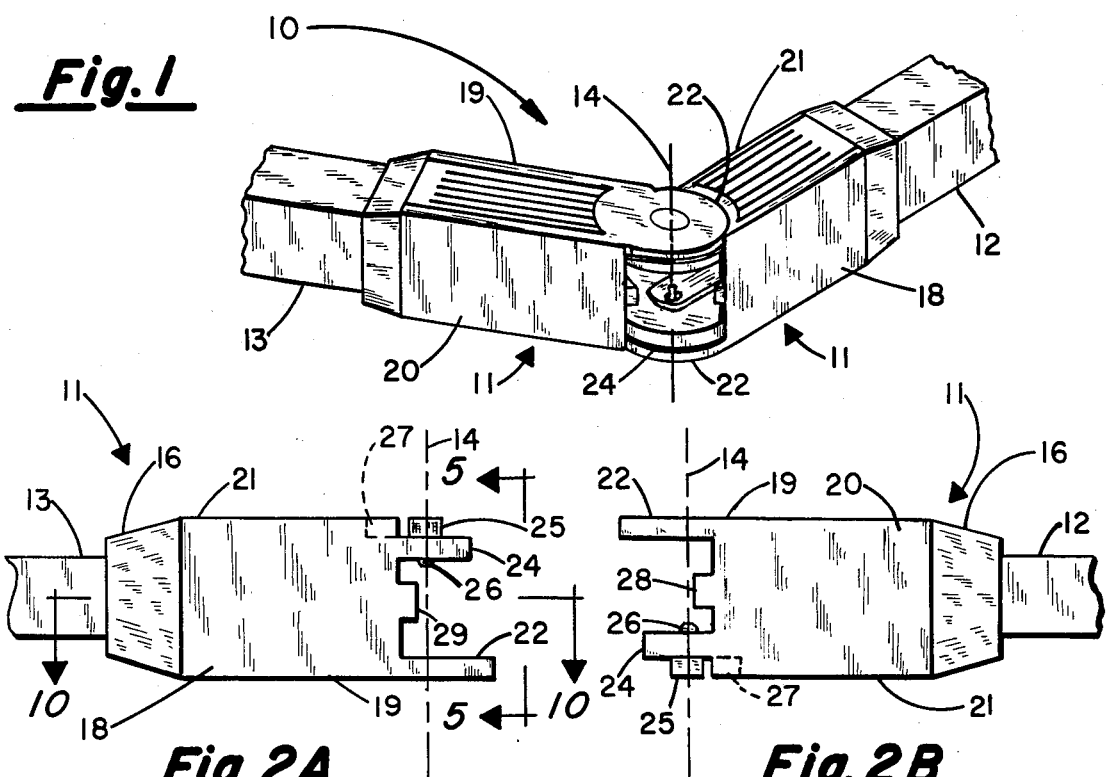
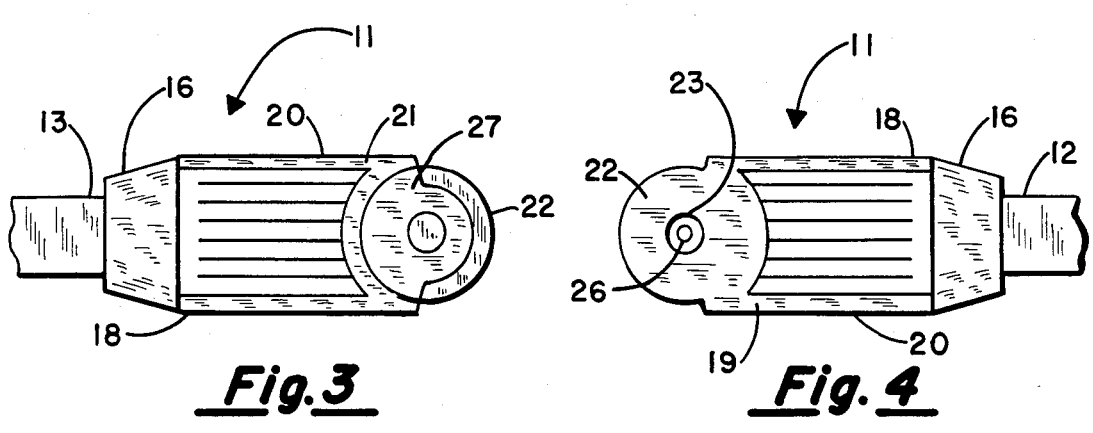
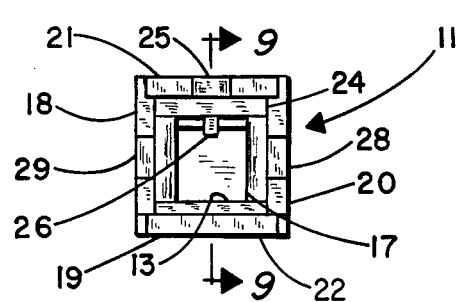
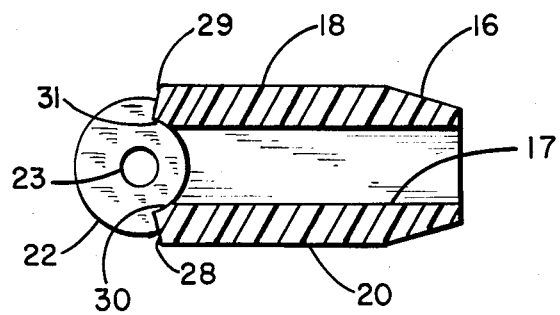

MICROPHONE BOOM HINGE

BACKGROUND OF THE INVENTION

This invention relates generally to microphone booms for use in conjunction with adjustably disposing a microphone on a boom depending from an earcup and/or headband in a communications headset. My invention is more particularly directed to a hinge assembly comprised of two members of exactly the same configuration to be disposed intermediate the ends of a microphone boom assembly to permit articulation of the microphone boom such that a microphone may be adjustably disposed about a single axis of rotation at the location of the hinge assembly to various locations adjacent to and away from the mouth of a communications headset user.

PRIOR ART

The prior art is replete with attempts to provide microphone booms that are adjustable in nature and ranges from the familiar gooseneck construction in which a boom is constructed to be flexible and adjustable over its entire length and to retain positions of such adjustment through the use of friction, and various and sundry hinge mechanisms at either end, such as at the mounting end in an earcup in a communications headset, or at the end at which the microphone is disposed and at various and sundry locations intermediate the ends and which may have limited or full degrees of adjustability.

My invention addresses the undue complexity of prior art attempts to provide for articulation of a microphone boom intermediate its ends and within a single plane of adjustability.

SUMMARY OF THE INVNETION

My invention provides a hinge for effecting an articulated joint intermediate adjacent sections of a microphone boom that is supported at one end on the earcup of communications headset and supports, at its other end, a microphone assembly to be adjustably disposed toward and away from the mouth of a user wearing the communications headset. Briefly, my hinge for effecting the articulated joint, operable in a single plane, is comprised of a two part hinge consisting of a pair of elements of like configuration which lockably receive respective ends of the intermediate portions of a microphone boom at one end and are lockably pivotally engaged at the other ends.

These and other advantages and features of my invention will become apparent from the appended detailed drawings, specification and claims.

BRIEF DESCRIPTION OF THE DRAWINGS

FIG. 1 is a perspective sketch of my hinge disposed upon the ends of an intermediate portion of a microphone boom for a communications headset;

FIG. 2A is a side elevational view of a hinge member illustrating my invention;

FIG. 2B is a side elevational view of a like hinge member rotated 180° about its longitudinal axis;

FIG. 3 is a top plan view of the illustration of FIG. 2A;

FIG. 4 is a top plan view of the illustration of FIG. 2B;

FIG. 5 is an end elevational view looking toward the right end of the FIG. 2A along section line 5—5;

FIG. 10 is a sectional view taken along section line 10—10 of FIG. 2A.

DESCRIPTION OF THE INVENTION

Figure 6:
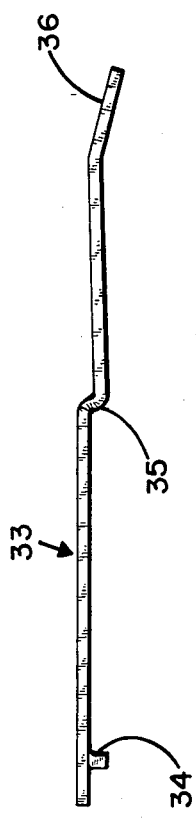
FIG. 6 is a side elevational view of a locking spring.
Figure 7:
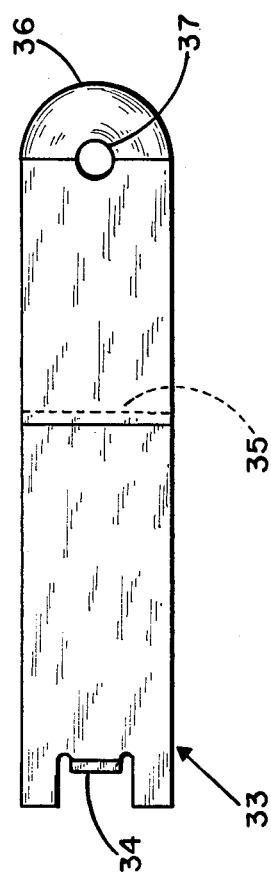
FIG. 7 is a bottom plan view of the locking spring of FIG. 6.
Figure 8:
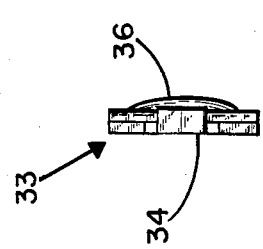
FIG. 8 is an end view of the locking spring of FIGS. 6 and 7.
Figure 9:
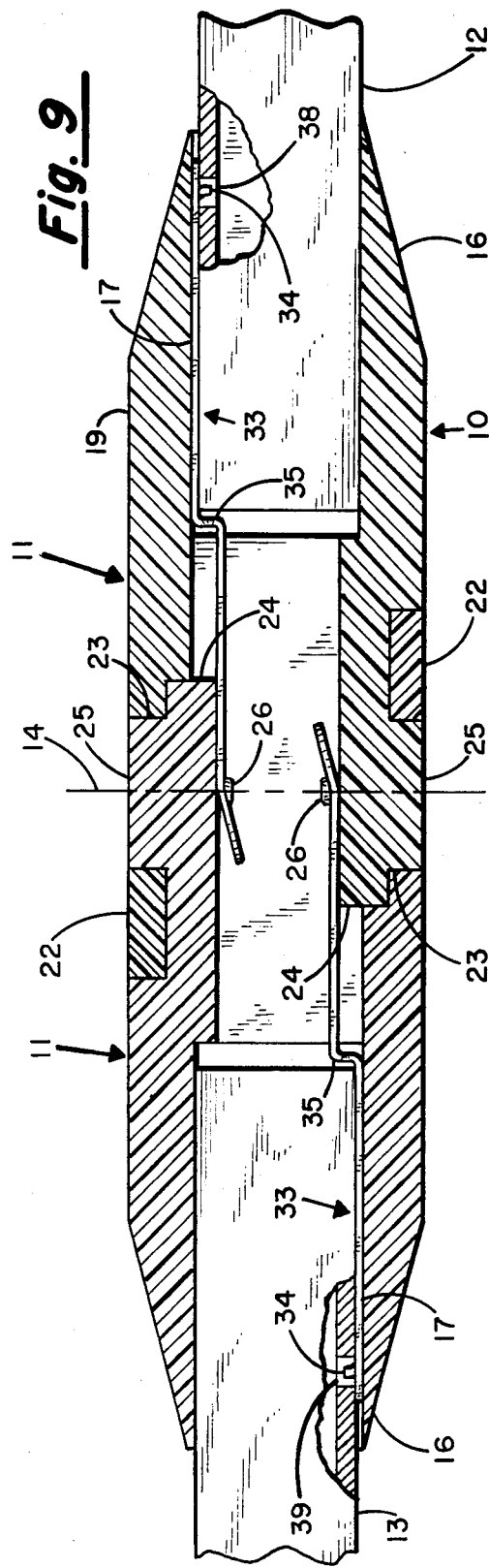
FIG. 9 is a sectional view taken along section line 9—9 in the relationship shown in FIG. 5 of a completed hinge assembly.

Referring to the drawings in which like elements are identified with like reference characters: it may be observed in FIGS. 1 and 9 that a completed hinge 10 is comprised of a pair of like hinge members 11, each disposed on the ends of microphone boom portions 12 and 13 and operable to provide articulation therefor about a transverse axis of rotation, 14. Microphone boom section 13 may depend from a headband or an earcup on a communications headset and microphone boom portion 12 may have a communications microphone mounted at its other end (not shown).

Each hinge member 11 is comprised of a longitudinally elongated body having a tapered end portion 16 adapted to be positioned over the end of a microphone boom and an interior aperture 17 dimensioned to slidably receive the end of a microphone boom. Each hinge member 11 has a pair of opposed first and third side surfaces 18 and 20 and a further pair of opposed side surfaces 19 and 21.

Depending from and extending longitudinally of side 19 of hinge member 11 is a generally semi-circular first ear 22 having an aperture 23 disposed about axis of rotation, 14. The outer surface of first ear 22 is disposed to be co-planar with the outer surface of side 19.

A second ear 24 extends longitudinally of side 21 from the same end of hinge member 11 is of semi-circular cross section and includes an outwardly extending pivot pin portion 25 and an inwardly extending locking pin 26. The outer surface of ear 24 is disposed inwardly of side 21 and a circular recess 27, adapted to receive circular ear 22 is provided in the surface of side 21. Pivot pin 25 has an outer end surface that is disposed in the plane of surface 21 and the height of pin 25 extending outwardly from the outer surface of ear 24 is dimensioned to be the same as the thickness of ear 22. Pivot pin 25 and locking pin 26 are shown disposed coaxially of axis 14. A pair of ramp-like stop members 28 and 29 are disposed and extending longitudinally of sides 20 and 18 respectively and adjacent to portions 30 and 31 extending on the inside walls toward aperture 17.

A locking spring 33 is shown having a downwardly depending ear 34, an offset portion 35, a ramp portion 36 and an aperture 37.

Hinge members 11 may be comprised of suitable rigid material such as hard plastic and locking spring members 33 may be formed of spring-type metallic material such as beryllium and the like.

Microphone boom members 12 and 13 are typically comprised of metallic material although suitable plastic may be utilized as long as a rigidity commensurate with the application is obtained. Microphone boom members 12 and 13 are shown having a hollow square cross section and each is provided with an aperture 38 and 39 respectively.

It may be noted that the cross-sectional dimensions of apertures 17 in hinge members 11 are such that, when used with a microphone boom of square cross-section, aperture 17 is rectangular in cross-section to provide clearance and to permit locking springs 33 to be disposed in position as shown, for example, in FIGS. 5 and 9.

Referring specifically to FIGS. 1 and 9, my hinge assembly 10 is shown in perspective and cross-sectional, side elevation outline and hinge 10 is assembled from using a pair of hinge members 11, a pair of locking springs 33 and microphone boom sections 12 and 13.

Assembly is accomplished by placing a locking spring 33 with ear 34 extending into, for example, aperture 39 in microphone boom section 13 and the assembly is slidably disposed in aperture 17 on a hinge member 11 oriented as shown in FIGS. 2A and 9. Similarly, a locking spring 33 is disposed with ear 34 extending into aperture 38 on a microphone boom section 12 and the assembly is slidably disposed in aperture 17 in a hinge member 11 in the orientation illustrated in FIGS. 2B and 9.

The assembly is completed by moving the ends of hinge members 11 longitudinally together, as oriented in FIGS. 2A and 2B, until the apertures 23 and pivot pins 25 are in axial alignment and completing the assembly by moving one or the other up or down so that the apertures 23 in ears 22 receive pivot pins 25 on ears 24 and apertures 37 on locking springs 33 are in engagement with locking pins 26 on ears 24 and thereafter hinge members may be pivoted relative one another about axis 14 to provide the articulation of a microphone boom comprised of microphone boom sections 12 and 13 to a limit determined by stop members 28 and 29 disposed intermediate ears 22 and 24.

The material of ears 22 and 24 and the spring characteristics of locking springs 33 acting along axis 14 will determine the frictional inter-engagement of ears 22 and 24.

It may also be appreciated by those skilled in the art to which my invention pertains that the elements of my hinge cooperate to provide an adjustable articulating means on an intermediate portion of a microphone boom that may be fabricated as by choice of materials, dimensions or the like so that the frictional characteristics thereof are more or less than a common mounting disposed on an earcup for adjustably supporting an entire microphone boom assembly. In one operative example, the hinge was fabricated to exhibit a lower frictional characteristics than the boom mounting on an earcup. This relationship resulted in operational characteristics wherein the microphone at the end of the boom was positioned in proper relationship to the mouth of a user and permitted, through articulation of my hinge on the intermediate portion of the boom, movement of the microphone away from and toward the mouth of the user without disturbing the adjustment performed on the earcup mounting to allow, for example, the microphone to be disposed to one side when donning or removing the headset.

I claim:

1. A hinge for an articulating microphone boom comprising in combination;
    an identical pair of hinge members, each having a longitudinally elongated body, first and third side walls disposed in spaced-apart parallel relationship and second and fourth side walls disposed in spaced-apart parallel relationship and perpendicular to said first and third side walls to form a longitudinally extending interior receptacle for receiving a microphone boom, said second and fourth side walls each having first and second ears of generally semicircular configuration extending longitudinally therefrom, said first ear being substantially the thickness and coplanar with said second side wall and including an aperture of circular cross-section disposed on an axis extending parallel to and intermediate said first and third side walls and said second ear extending from said fourth side wall and being spaced inwardly the thickness of said first ear and including an outwardly extending pivot pin of circular cross section, coaxial with said axis and of a length substantially the same as the thickness of said first ear, said hinge members being disposed in inter-fitting pivoting relationship with said pivot pins on said second ears disposed in said apertures in said first ears and said interior receptacles are rotatable about said axis.

2. The subject matter of claim 1 in which locking means are disposed intermediate the second ears.

3. The subject matter of claim 2 in which the locking means extend intermediate the longitudinal apertures in the hinge members and the second ears.

4. The subject matter of claim 3 in which the locking means engage an end of microphone boom.

5. The subject matter of claim 2 in which a locking pin extends inwardly of the second ears for engagement with the locking means.

6. The subject matter of claim 3 in which a locking pin extends inwardly of the second ears for engagement with the locking means.

7. The subject matter of claim 4 in which a locking pin extends inwardly of the second ears for engagement with the locking means.

8. The subject matter of claim 2 in which each of the hinge members is provided with a longitudinally elongated locking means comprised of resilient material and including an ear extending into an aperture in a microphone boom at one end, a step for engaging the end of a microphone boom intermediate the ends and means for biasing a second ear towards a first ear at the other end.

9. The subject matter of claim 3 in which each of the hinge members is provided with a longitudinally elongated locking means comprised of resilient material and including an ear extending into an aperture in a microphone boom at one end, a step for engaging the end of a microphone boom intermediate the ends and means for biasing a second ear towards a first ear at the other end.

10. The subject matter of claim 4 in which each of the hinge members is provided with a longitudinally elongated locking means comprised of resilient material and including an ear extending into an aperture in a microphone at one end, a step for engaging the end of a microphone intermediate the ends and means for biasing a second ear towards a first ear at the other end.

11. The subject matter of claim 5 in which each of the hinge members is provided with a longitudinally elongated locking means comprised of resilient material and including an ear extending into an aperture in a microphone boom at one end, a step for engaging the end of a microphone boom intermediate the ends and means for biasing a second ear towards a first ear at the other end.

* * * * *